(12) United States Patent
Johnson

(10) Patent No.: US 9,820,568 B2
(45) Date of Patent: Nov. 21, 2017

(54) INTEGRAL TRAY TABLE PERSONAL ELECTRONIC DEVICE HOLDER AND TRAY TABLE

(71) Applicant: B/E AEROSPACE, INC., Wellington, FL (US)

(72) Inventor: Glenn A. Johnson, Rural Hall, NC (US)

(73) Assignee: B/E Aerospace, Inc., Wellington, FL (US)

(*) Notice: Subject to any disclaimer, the term of this patent is extended or adjusted under 35 U.S.C. 154(b) by 0 days.

(21) Appl. No.: 15/354,343

(22) Filed: Nov. 17, 2016

(65) Prior Publication Data

US 2017/0135468 A1 May 18, 2017

Related U.S. Application Data

(60) Provisional application No. 62/256,293, filed on Nov. 17, 2015.

(51) Int. Cl.
*B64D 11/00* (2006.01)
*A47B 23/06* (2006.01)
*A47B 23/02* (2006.01)
*A47C 7/70* (2006.01)
*B64D 11/06* (2006.01)
*B60N 3/00* (2006.01)

(52) U.S. Cl.
CPC .............. *A47B 23/06* (2013.01); *A47B 23/02* (2013.01); *A47C 7/70* (2013.01); *B64D 11/0015* (2013.01); *B64D 11/00152* (2014.12); *B64D 11/0638* (2014.12); *B60N 3/004* (2013.01)

(58) Field of Classification Search
CPC .......... A47B 23/00; A47B 23/02; A47B 23/06; A47C 7/70; B64D 11/0015
USPC ....................................................... 108/29, 42
See application file for complete search history.

(56) References Cited

U.S. PATENT DOCUMENTS

| | | | |
|---|---|---|---|
| 2011/0278885 A1* | 11/2011 | Procter ............... | B60R 11/0235 297/135 |
| 2013/0070171 A1* | 3/2013 | Boyer, Jr. .......... | B64D 11/0015 348/837 |
| 2013/0093220 A1* | 4/2013 | Pajic ........................ | A47C 7/70 297/163 |
| 2016/0143435 A1* | 5/2016 | Kim ........................ | B60N 3/004 248/447.1 |
| 2016/0257404 A1* | 9/2016 | Ferris ............... | B64D 11/00152 |
| 2016/0270526 A1* | 9/2016 | Siemer ................... | F16M 11/38 |
| 2016/0324310 A1* | 11/2016 | Li .......................... | G06F 1/1626 |

* cited by examiner

*Primary Examiner* — Daniel J Rohrhoff
(74) *Attorney, Agent, or Firm* — Shumaker, Loop & Kendrick, LLP

(57) ABSTRACT

A deployable device holder adapted to mount to a tray table to support a personal electronic device in a position apart from the tabletop surface of the tray table such that the tray table and electronic device holder can be used simultaneously. The device holder includes pairs of moveable support members and a cross member for effecting unison movement of the support members as the device holder moves between stowed and deployed positions thereof.

18 Claims, 4 Drawing Sheets

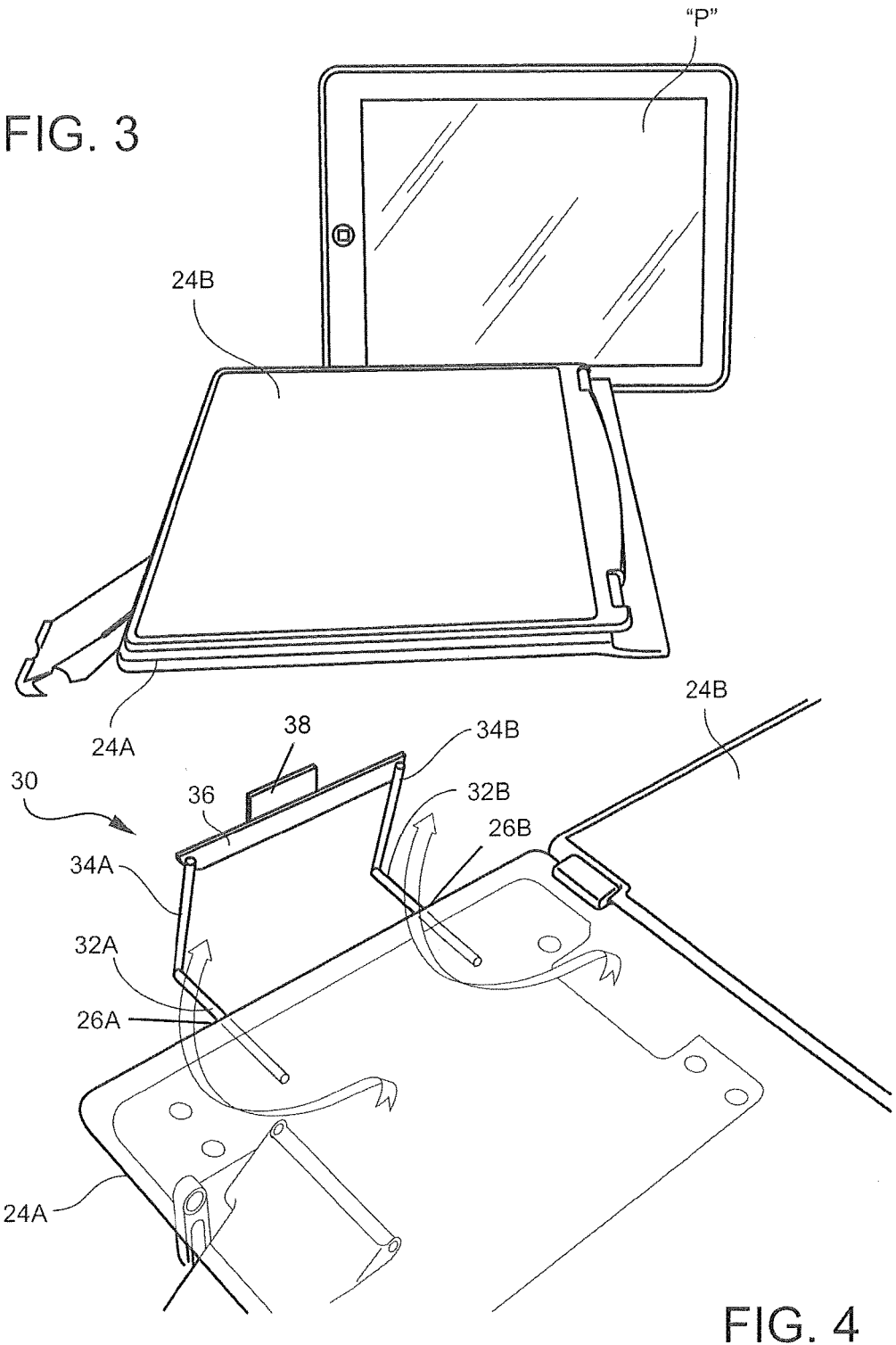

INTEGRAL TRAY TABLE PERSONAL ELECTRONIC DEVICE HOLDER AND TRAY TABLE

CROSS-REFERENCE TO RELATED APPLICATION

This application claims priority from U.S. Application No. 62/256,293 filed Nov. 17, 2015, the contents of which are incorporated by reference herein.

TECHNICAL FIELD AND BACKGROUND OF THE INVENTION

The present invention relates generally to the field of deployable tray tables and assemblies for facilitating hands-free use of portable electronic devices, and more particularly, to a tray table-mounted personal electronic device holder adapted for use with various tray table configurations with minimal alteration and impact to the respective tray table and use thereof.

Portable electronic devices are commonly used aboard commercial airliners and other conveyances to watch movies, read, work, etc. Examples of such devices include, but are not limited to, smart phones, tablets, laptops and like devices that may or may not be equipped with a detachable keyboard. Hands-free use of such devices is desirable, particularly during long-haul flights.

Attempts have been made to incorporate device support structure into conventional seatbacks and tray tables to facilitate hands-free use. For example, seatback deployable tray tables in coach seating classes have been modified to incorporate deployable shelves and/or ledges. In one particular example, the shelf may be incorporated into the tray table top in the form of a depression, such that the device sits in the depression and leans against the seatback to hold the device at an optimal viewing angle. In another example, the shelf may deploy from "beneath" the tray table, thereby first requiring the tray table to be deployed before the shelf can be deployed. In yet another example, the tray table itself can become the shelf, and thus cannot be used simultaneously as both a tray table and a shelf. In each of the foregoing examples, usable surface area of the deployed tray table for other purposes is reduced because of the surface area consumed by the propped device.

Business and premium seating classes can utilize fixture mounted or armrest deployable tray tables. Such tray tables which incorporate portable electronic device holders also suffer from reduced surface area for uses other than device support.

Accordingly, what is needed is a solution for supporting a portable electronic device for hands-free use which is readily adaptable to various tray table configurations, and which does not reduce the usable surface are of the tray table itself. Such a solution would allow the tray table and device holder to be used together and simultaneously, thereby enhancing the functionality of the tray table and providing a readily installable and lightweight solution for holding portable electronic devices, among other purposes and advantages.

BRIEF SUMMARY OF THE INVENTION

It is therefore an object of the present invention to provide a tray table personal electronic device holder, and a tray table adapted for use with such a holder.

It is another object of the invention to provide a tray table personal electronic device holder adapted to be used with existing tray tables with minimum alteration necessary to the tray tables, as well as on tray tables manufactured with the capability of accepting the holder.

It is a further object of the invention to provide a tray table personal electronic device holder that allows the holder to be positioned for use behind the top of the tray table (i.e., apart from the passenger), thus preserving the entire top surface area of the tray table for other uses by the seat occupant.

It is another object of the invention to provide a tray table personal electronic device holder that does not interfere with the folding of tray tables of the type that can be folded onto themselves to provide a table top of reduced size for use and/or stowing.

To achieve the foregoing and other objects and advantages, in one embodiment the present invention provides a tray table mountable device holder for a personal electronic device including first and second support members adapted to be rotatably and/or slidably disposed in respective openings along a back edge of a tray table, first and second elevation members attached to respective ends of the first and second support members and moveable between a stowed position in alignment with a horizontal plane of the tray table and a deployed position extending upwardly above a top surface of the tray table, a cross member extending between and connecting the first and second elevation members to effect unison rotational movement of the first and second elevation members between the stowed position and the deployed position, and a plate attached to the cross member and extending upwardly above a top surface of the cross member.

In a further embodiment, the first and second elevation members may be pivotally attached to respective opposing ends of the cross member.

In a further embodiment, the first and second support members may be spaced-apart and parallel, and the first and second elevation members may be spaced-apart and parallel.

In a further embodiment, the first support member and the first elevation member may be a unitary angled member, and the second support member and the second elevation member may be a unitary angled member.

In a further embodiment, a length of the plate may be less than a length of the cross member, and the plate may be centered along the length of the cross member.

In a further embodiment, each of the first support member, the second support member, the first elevation member, and the second elevation member may be an elongate linear rod, and the cross member may be an elongate linear plate.

In a further embodiment, at least one of the cross member and the plate may include a friction-enhancing coating.

In a further embodiment, in the stowed position, the first elevation member, the second elevation member, and the cross member may all align in a common horizontal plane.

In a further embodiment, in the deployed position, the first and second elevation members may be parallel to each other and at an angle to a longitudinal axis of the cross member.

In a further embodiment, in the stowed position, the plate may extend above the top surface of the tray table.

According to another embodiment, the present invention provides a tray table adapted to hold a personal electronic device including a table segment having a tabletop and a pair of spaced openings along one edge, and a device holder configured to hold the personal electronic device apart from the tabletop. The device holder includes first and second support members adapted to be rotatably and/or slidably disposed in respective ones of the spaced openings, first and second elevation members attached to respective ends of the first and second support members and moveable between a stowed position in alignment with a horizontal plane of the tray table and a deployed position extending upwardly above the tabletop, a cross member extending between and connecting the first and second elevation members to effect unison rotational movement of the first and second elevation members between the stowed position and the deployed position, and a plate attached to the cross member and extending upwardly above a top surface of the cross member.

In a further embodiment, the tray table can include first and second hinged table segments to permit folding.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIG. 3 is a front perspective view of the tray table of FIG. 1 illustrating folding capability of the tray table without interference from the attached device holder;

FIG. 4 is a fragmentary perspective view illustrating device holder movement and attachment;

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, the present invention provides a personal electronic device holder adapted for use with a variety of tray table configurations of the type found, for example, on board an airliner. The device holder mounts to the tray table in such a way that the entirety of the tabletop is preserved for use for purposes other than as a support surface for a personal electronic device. In a particular embodiment, the device holder supports the personal electronic device in a position behind the tray table as viewed by the seated occupant. Such a position leaves open the entirety of the tabletop forward of the electronic device for working, dining, etc. In such an arrangement, the tabletop and the electronic device can be used together and/or simultaneously. Although the tray table shown is an armrest deployable table including folding segments, the device holder according to the present invention is adapted to mount to other table types that may or may fold.

Figure 1:
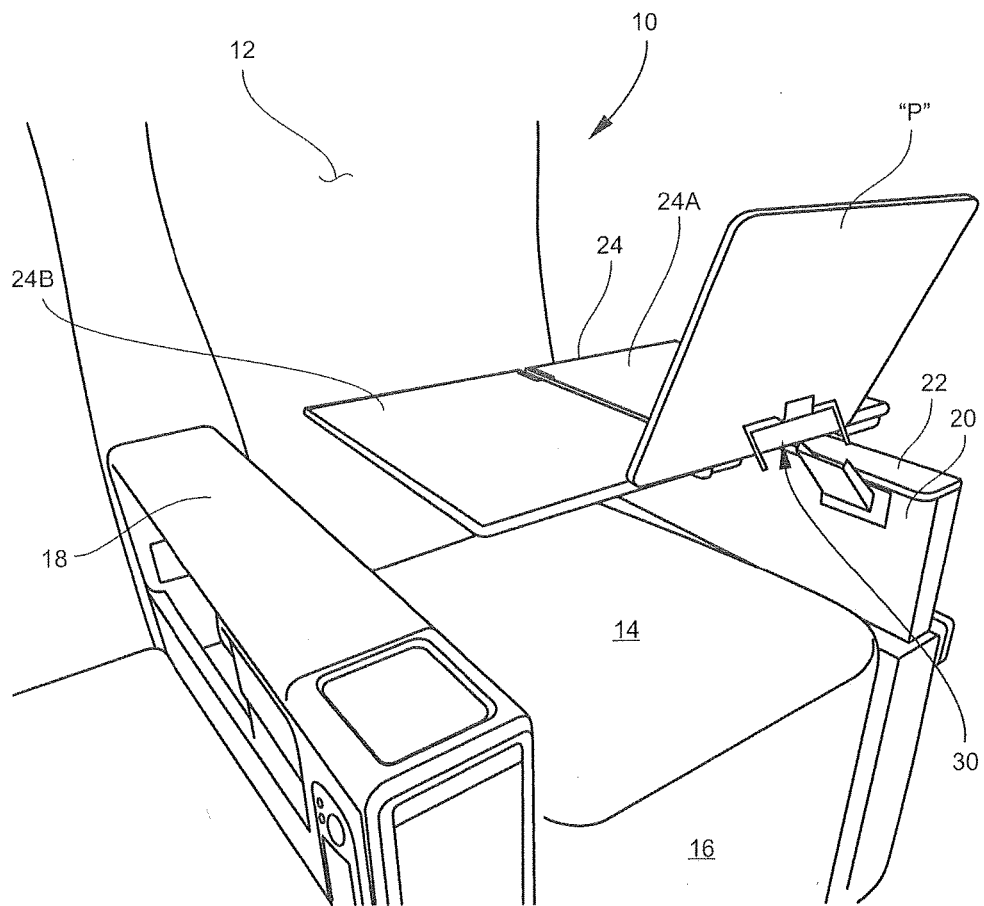
FIG. 1 is a rear perspective view of a tray table on which is mounted a personal electronic device holder according to one embodiment of the present invention.

Referring to FIG. 1, for reference purposes and not for purposes of limitation, a passenger seat 10 generally includes a seat back 12, a seat bottom 14, and a deployable leg rest 16. The seat 10 may further include right and left armrests 18, 20, from which the tray table may deploy from beneath a top cap 22. The tray table 24 may deploy from within the armrest 20 in the case of a premium or business class seat. The tray table 24 can include, in an exemplary embodiment, a lifting mechanism and/or multi-directional hinge allowing the tray table to move between a substantially vertical orientation when stowed, and a substantially horizontal orientation when deployed.

The tray table 24 shown includes first and second tray table segments 24A and 24B interconnected by a hinge that allows the first segment 24A to fold into facing contact with the second segment 24B, or vice versa. The tray table 24 may fold closed to provide a more compact package for stowing, and may open to expand the usable surface area of the tray table for working, dining, etc. The tray table 24 is preferably supported from below or the side by a support arm, which positions the tray table 24 in an overseat position for ergonomic use.

Figure 2:
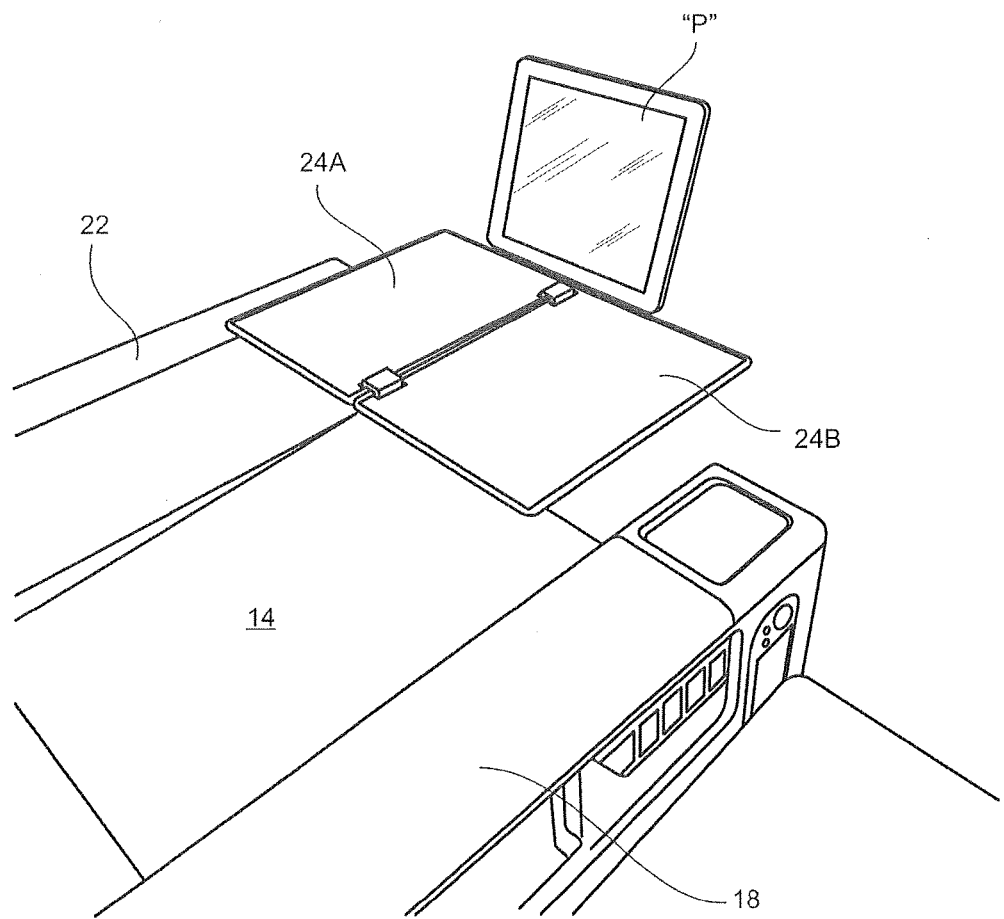
FIG. 2 is a front perspective view of the tray table of FIG. 1.

A personal electronic device holder 30, also referred to herein as device holder 30, serves to support a personal electronic device "P" in a generally upright ergonomic position for viewing/use by a passenger seated in seat 10. Referring to FIG. 2, from the perspective of the seated passenger, the device holder positions the electronic device "P" entirely behind or "forward" of the tabletop surface of the tray table 24, thereby allowing simultaneous and unobstructed use of the both the tray table 24 and the electronic device "P". Examples of electronic devices capable of being supported by the device holder 30 include, but are not limited to, tablets (as shown), smartphones, laptops, etc. The device holder 30 can also be used to support other items such as books, magazines, etc. The electronic device "P" can be held in a portrait or landscape orientation, and is preferably held at an angle to vertical such that the device is prone to leaning back and not falling forward.

FIG. 2 shows the tray table in a fully deployed configuration with segments 24A and 24B unfolded to provide maximum tabletop surface area. The electronic device "P" is shown substantially centered between the two table segments 24A and 24B, which can be achieved by positioning the device holder on one segment in close proximity to the laterally-adjacent segment and/or by positioning the electronic device "P" off-center with respect to the device holder.

FIG. 3 shows the tray table in a folded configuration with the second segment 24B folded flat against and atop first segment 24A. The electronic device "P" is held entirely behind the tabletop surfaces such that the electronic device "P" is positioned behind and does not interfere with segment folding and unfolding. This allows full use and operation of the tray table without having to remove or disturb the portable electronic device "P". If desired, the second segment 24B can be folded onto the first segment 24A to provide a tray table having the same depth, but only half the length.

FIG. 4 is a fragmentary view of the tray table showing attachment and movement of the device holder 30. The device holder 30 as shown is attached/mounted to one of the two tray table segments 24A, 24B. The device holder 30 includes first and second support members 32A, 32B received within corresponding first and second openings 26A, 26B positioned along an edge (e.g., back edge) of the first segment 24A. When the tray table is deployed, the first and second support members 32A, 32B are generally horizontally-oriented. The first and second support members 32A, 32B can be elongate linear rods, and are rotatably and/or slidably received within the corresponding first and second openings 26A, 26B such that the support members 32A, 32B can retract into or be withdrawn from the openings to adjust device holder depth, and can rotate relative to the openings to stow and deploy the device holder 30.

First and second elevation members 34A, 34B are attached to respective ends of the first and second support members 32A, 32B, and are moveable between a stowed position in alignment with a horizontal plane of the tray table segment 24A, and a deployed position as shown extending upwardly above a top surface of the tray table segment 24A. The first and second support members 32A, 32B are arranged spaced-apart and parallel, and the first and second elevation members 34A, 34B are arranged spaced-apart and parallel. The first support member 32A and the first elevation member 34A can be a unitary (i.e., one piece) angled member. The second support member 32B and the second elevation member 34B can be a unitary (i.e., one piece) angled member. At least one of the first support member 32A, second support member 32B, first elevation member 34A, and second elevation member 34B can be an elongate linear rod.

A cross member 36 extends between and connects the first and second elevation members 34A, 34B to effect unison rotational movement of the first and second elevation members 34A, 34B between the stowed and deployed positions of the device holder 30. The cross member 36 can be an elongate plate pivotally attached at opposing thereof to the respective ends of the first and second elevation members 34A, 34B. A plate 38 is attached to the cross member 36 and extends upwardly above a top surface of the cross member 36. The plate 38 has a length less than a length of the cross member 36, and can be generally centered along the length of the cross member 36 or otherwise positioned. At least one of the cross member 36 and the plate 38 can be made from or coated with a friction-enhancing material to help prevent relative motion between the device holder 30 and the electronic device "P".

Figure 5:
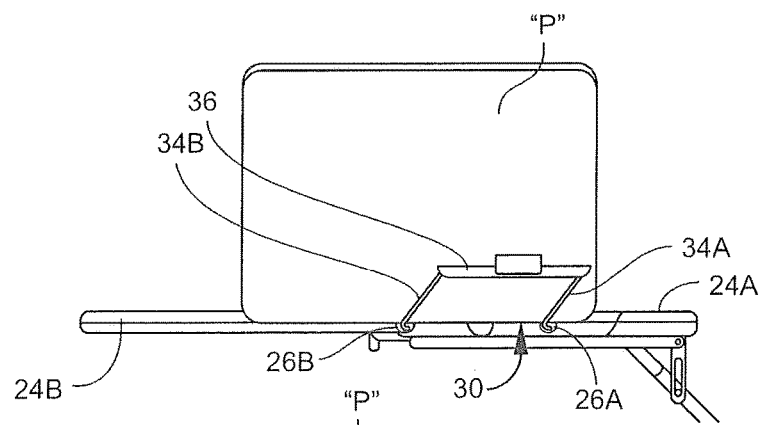
FIG. 5 is a rear elevation view illustrating a first alternative deployed position of the device holder.
Figure 6:
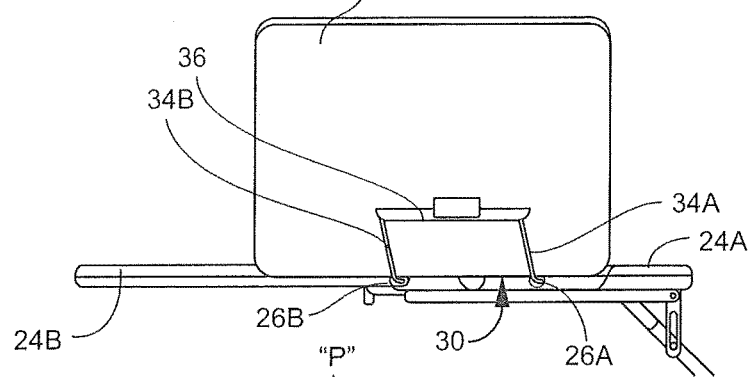
FIG. 6 is a rear elevation view illustrating a second alternative deployed position of the device holder.
Figure 7:
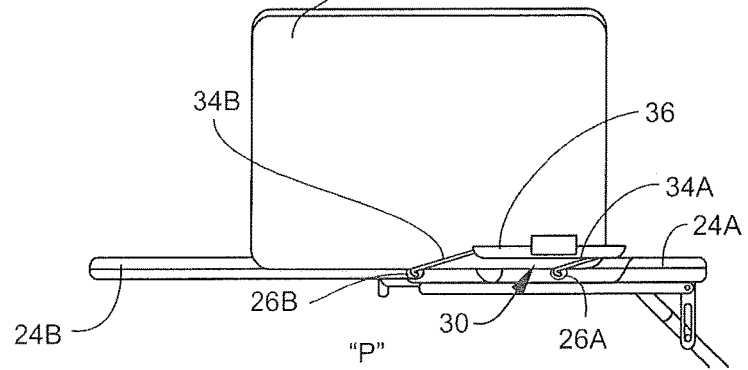
FIG. 7 is a rear elevation view illustrating a third alternative deployed position of the device holder.

FIGS. 5-8 show various positions of the device holder 30. FIG. 5 shows a first deployed position of the device holder 30 wherein the device holder 30 is mounted to the first segment 24A and is tilted in a direction away from the second segment 24B. Tilting can be achieved by urging the cross member 36 in a direction away from the second segment 24B, thereby moving in unison the first and second elevation members 34A, 34B. FIG. 6 shows a second deployed position of the device holder 30 wherein the device holder 30 is mounted to the first segment 24A and is tilted in a direction toward the second segment 24B. FIG. 7 shows a third deployed position of the device holder 30 wherein the device holder 30 is near the stowed position. In this third position the first and second elevation members 34A, 34B are near a horizontal orientation.

Figure 8:
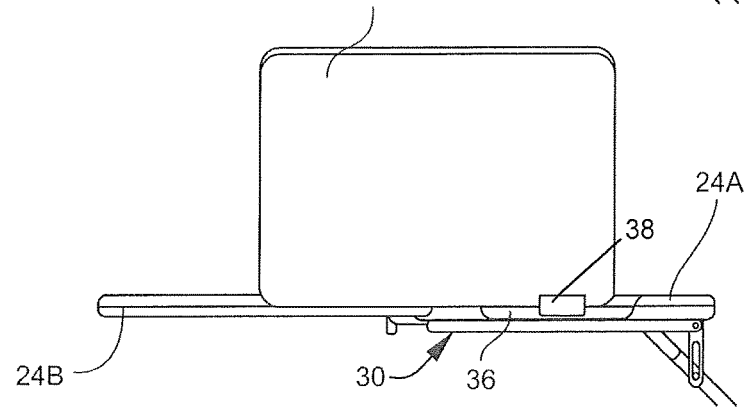
FIG. 8 is a rear elevation view illustrating a fully stowed position of the device holder.

FIG. 8 shows a fully stowed position of the device holder 30 wherein the first table segment 24A, the first elevation member 34A, the second elevation members 34B, and the cross member 36 all reside in a common horizontal plane. In the fully stowed position, the plate 38 extends above the cross member 36 and the tabletop such that a lip is provided along the back edge of the tabletop for preventing the electronic device "P" or other items from sliding off the tabletop in a direction of the back edge. As such, the plate 38 is functional when the device holder 30 is deployed or fully stowed.

To stow the device holder 30, the cross member 36 is pushed to the side (i.e., laterally), thereby causing the pivotally attached first and second elevation members 34A, 34B to pivot such that the cross member 36 is lowered to a position below the surface plane of the tray table (FIG. 8). In this position, the device holder 30 is stowed such that it does not interfere with the tray table 24 in either the deployed position thereof, or when stowed in the armrest. To deploy the device holder 30, the cross member 36 is moved laterally in the opposite direction such that the first and second elevation members 34A, 34B are angled and elevated above the surface plane of the tray table 24. Deployed positions include any position where the first and second elevation members 34A, 34B are out of parallel alignment with the cross member 36.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A tray table mountable device holder for a personal electronic device, comprising:
   first and second support members adapted to be rotatably or slidably disposed in respective openings along a back edge of a tray table;
   first and second elevation members attached to respective ends of the first and second support members and moveable between a stowed position in alignment with a horizontal plane of the tray table and a deployed position extending upwardly above a top surface of the tray table;
   a cross member extending between and connecting the first and second elevation members to effect unison rotational movement of the first and second elevation members between the stowed position and the deployed position; and
   a plate attached to the cross member and extending upwardly above a top surface of the cross member;
   wherein the first support member and the first elevation member are a unitary angled member, and the second support member and the second elevation member are a unitary angled member.

2. The device holder according to claim 1, wherein the first and second elevation members are pivotally attached to respective opposing ends of the cross member.

3. The device holder according to claim 1, wherein the first and second support members are spaced-apart and parallel, and the first and second elevation members are spaced-apart and parallel.

4. The device holder according to claim 1, wherein a length of the plate is less than a length of the cross member, and the plate is centered along the length of the cross member.

5. The device holder according to claim 1, wherein each of the first support member, the second support member, the first elevation member, and the second elevation member is an elongate linear rod, and the cross member is an elongate linear plate.

6. The device holder according to claim 1, wherein at least one of the cross member and the plate comprises a friction-enhancing coating.

7. The device holder according to claim 1, wherein in the stowed position, the first elevation member, the second elevation member, and the cross member all align in a common horizontal plane.

8. The device holder according to claim 1, wherein in the deployed position, the first and second elevation members are parallel to each other and at an angle to a longitudinal axis of the cross member.

9. The device holder according to claim 1, wherein in the stowed position, the plate is adapted to extend above the top surface of the tray table.

10. A tray table adapted to hold a personal electronic device, comprising:
  a first table segment having a tabletop and a pair of spaced openings along one edge, and a second table segment hinged along one edge to the first table segment such that the second table segment can fold onto the first table segment; and
  a device holder configured to hold the personal electronic device apart from the tabletop, the device holder comprising:
    first and second support members adapted to be rotatably or slidably disposed in respective ones of the spaced openings;
    first and second elevation members attached to respective ends of the first and second support members and moveable between a stowed position in alignment with a horizontal plane of the tray table and a deployed position extending upwardly above the tabletop;
    a cross member extending between and connecting the first and second elevation members to effect unison rotational movement of the first and second elevation members between the stowed position and the deployed position; and
    a plate attached to the cross member and extending upwardly above a top surface of the cross member.

11. The tray table according to claim 10, wherein the first and second elevation members are pivotally attached to respective opposing ends of the cross member.

12. The tray table according to claim 10, wherein the first and second support members are spaced-apart and parallel, and the first and second elevation members are spaced-apart and parallel.

13. The tray table according to claim 10, wherein the first support member and the first elevation member are a unitary angled member, and the second support member and the second elevation member are a unitary angled member.

14. The tray table according to claim 10, wherein a length of the plate is less than a length of the cross member, and the plate is centered along the length of the cross member.

15. The tray table according to claim 10, wherein each of the first support member, the second support member, the first elevation member, and the second elevation member is an elongate linear rod, and the cross member is an elongate linear plate.

16. The tray table according to claim 10, wherein in the stowed position, the first elevation member, the second elevation member, and the cross member all align in a common horizontal plane.

17. The tray table according to claim 10, wherein in the deployed position, the first and second elevation members are parallel to each other and at an angle to a longitudinal axis of the cross member.

18. The tray table according to claim 10, wherein in the stowed position of the device holder, the plate extends above the tabletop.

* * * * *